March 26, 1935.    G. A. BARDET ET AL    1,995,494
MEANS FOR ATTACHING KEYS TO CAN ENDS
Filed March 27, 1933
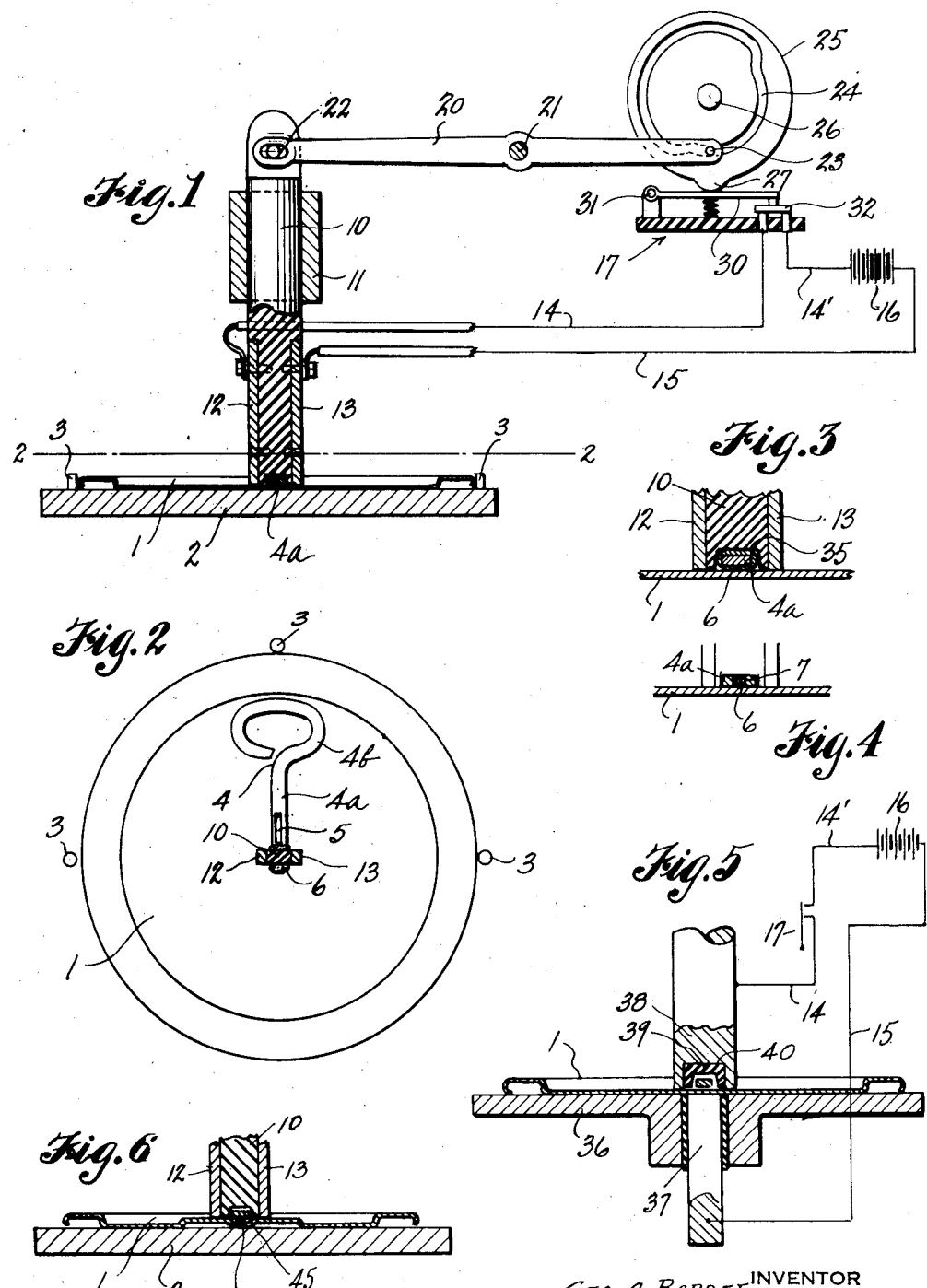
INVENTOR
GEO. A. BARDET
GEO. V. BARDET
BY
Cook & Robinson
ATTORNEY Patented Mar. 26, 1935

1,995,494

UNITED STATES PATENT OFFICE 1,995,494

MEANS FOR ATTACHING KEYS TO CAN ENDS

George A. Bardet and George V. Bardet, Berkeley, Calif., assignors to M-J-B Company, a corporation of Delaware Application March 27, 1933, Serial No. 663,027

1 Claim. (Cl. 219—12)

This invention relates to means for making soldered connections and it has reference particularly to means for soldering to a tearing strip can, the key which may be used subsequently in removing the strip from the can.

Heretofore, solder tipped and solder bearing keys have been attached to the ends of tearing strip cans by heating the key while held engaged with the can end, thereby to fuse the solder which, on hardening, attaches the key to the can end. To my knowledge, fusing of the solder has heretofore been accomplished only by directly heating the key by passing an electric current through the solder bearing portion thereof.

It has been the principal object of this invention to depart from the usual methods of key attachment and means for heating the key, and to eliminate some of the difficulties which heretofore have been incident to the methods of attachment used, and at the same time, to provide simple yet effective means whereby the attaching operation is effected by electrically heating that part of the can wall against which the solder bearing part of the key is applied.

It is also an object of this invention to provide a pair of spaced, electric contacts, insulated from each other and connected with opposite sides of a source of current and movable, after the key has been placed on the can end, against the end closely adjacent opposite sides of the key, thus to complete a circuit through the can wall between the contacts through which current will flow to heat the end sufficiently to fuse the solder for attaching the key. In our co-pending application Serial No. 663,026 of even date, we have provided for fusing the solder by passing an electric current through the key and the can end on which it is disposed.

Other objects reside in the various details of construction, in the combination of parts and in their mode of operation, as will hereinafter be described.

In accomplishing these and other objects of the invention, I have provided the improved details of construction, the preferred forms of which are illustrated in the accompanying drawing, wherein—

Fig. 1 is a sectional view, illustrating a key attaching mechanism embodied by the present invention; the circuit connections being diagrammatically shown.

Fig. 2 is a horizontal section taken on line 2—2 in Fig. 1.

Fig. 3 is an enlarged sectional view of a portion of the can end wall and solder tipped key.

Fig. 4 is a similar sectional view, illustrating the attachment of a key having a solder containing hole therein.

Fig. 5 is a sectional detail illustrating an attaching means of alternative form.

Fig. 6 illustrates attachment of a key by fusing solder that is not carried by the key.

Referring more in detail to the drawing—

1 designates what may be a can end wall in its usual form prior to its being seamed or otherwise attached to the can body. As herein illustrated, the can end is placed upon a support 2 in position for attaching the key thereto. For properly locating the can end with respect to the attaching means, it may be confined within guides or positioning stops on the base as designated at 3. The can end is metallic and is electrically conductive and therefore may be heated by passing an electric current through it. A key, to be attached to the can end, is designated at 4 and it may consist of a metallic plate of desired form, or may consist of a metallic wire bent into suitable form. As here shown, the key has a shank 4a and a handle portion 4b and a slot 5 is provided in the shank for receiving the tongue of the tearing strip of the can when the latter is to be removed by means of the key.

This key, as illustrated best in Fig. 3, is a solder bearing key. That is, it carries thereon a certain amount of solder for securing it to the can wall. Preferably the end of the shank is solder tipped by dipping it in molten solder, then permitting the solder which clings to the key to cool prior to applying the key to the can end. The solder thus applied, as designated at 6, may later be melted or fused to serve as the medium of attaching the key to the can end. In some instances it may be more desirable to confine the solder within a small hole in the key, as is illustrated at 7 in Fig. 4. It is not desired, however, that the present application be confined to any particular type of key or application of solder, but to broadly cover the present means and method of applying the heat for the solder fusing operation. In some instances the solder may be applied separately from the key, as disclosed in Fig. 6.

The solder melting and fusing means, as illustrated in Fig. 1, comprises an insulating and nonconductive support 10 that is vertically movable in a guide 11. Fixed to the opposite sides of the support 10 are electrically conductive contacts 12 and 13 having their lower ends terminating flush with, or just slightly beyond, the lower end of the support 10. These contacts have electrical connections through wires 14—14' and 15 with a source of electricity designated at 16 which is suitable for the present purpose. Also, there is a switch mechanism designated at 17, presently described, in the connection 14—14', operable to close or open the circuit at proper times.

For moving the support 10 toward and from the can end, for the soldering operation, I have shown a lever 20 pivotally supported between its ends as at 21, and having a pin and connection 22 at one end with the upper end of the support 10, and provided at its opposite end with a pin 23 adapted to follow in a cam groove 24 formed in a cam wheel 25 rotatably driven and supported by a shaft 26. There is also provided on the periphery of the wheel a lug 27 for closing the switch 17. The switch mechanism comprises a spring pressed lever 30 pivotally supported at one end as at 31 and mounting a bar 32 at its opposite end. The lever 30 is arranged adjacent the cam wheel in a position at which it will be engaged by the lug 27, with each rotation of the cam, and depressed thereby to cause the bar 32 to engage with the ends of the wires 14'—14' to close the circuit connection between the contact 12 and source of current 16.

This lug 27 is shown so located relative to the cam slot that it will engage the switch lever 30 and close the switch during the interval that the support 10 is in its lowered position and the cam slot 24 is so designed that it will move the support 10 downwardly toward and the contacts 12 and 13 against the can end, as shown in Fig. 1, to effect the soldering operation, and will then lift the support for removal of the can end from the base 2.

The lower end of the support 10 is recessed, as seen at 35, to receive the key shank therein, and this recess may be of such depth as to clear the key during the soldering operation, or it may be of just such depth as to exert a slight pressure against the key.

Assuming the parts to be so constructed, briefly the operation is as follows:—

First, a can end 1, with the key 4 properly located thereon, is placed on the support 2 and definitely located by the guides or stops 3. As the cam 25 rotates, the action imparted to the lever 20 moves the support 10 from raised position, as seen in dotted lines, to lowered position to bring the contacts 12 and 13 against the can end at opposite sides of the key. After the support 10 has moved downwardly and the contacts 12 and 13 have engaged the can end wall, then the lug 27 of the cam engages the lever 30 to close the switch 17, thereby closing the circuit through the contacts and through that portion of the can end directly between the contacts against which the solder bearing portion of the key is located. The flow of current is sufficient to heat that part of the can end, thereby to melt the solder for attaching the key. The closing of the circuit is only momentary, or of that time required to melt the solder, but it is desirable that the contacts remain against the cover a short interval after the circuit has been opened so as not to disturb the key until the melted solder has had sufficient time to set.

In Fig. 5 I have illustrated an alternative construction in which the can end 1 is located upon a support 36 and a contact member 37 extends upwardly through this engagement with the can end. An upper contact 38 is movable from and against the can end. This contact has an insulating block 39 fitted in a transverse recess 40 in the lower end of contact 38 to receive the key. The contacts 37 and 38 are connected with a source of current 16 by wires 14—14' and 15, through a switch 17, as in the device of Fig. 1, and the upper contact is movable from and against the can end as are the contacts of Fig. 1. The illustration shows the upper and lower contacts in axial alinement; the upper contact being of greater diameter. In the use of this modification, the upper contact is brought down against the can end and a circuit is then closed between the contacts through the can end. This is maintained, as in the other device, to sufficiently heat the can end for fusing the solder on the key.

In Fig. 6, I have shown a can end having a central depression 45 for a small piece of solder 46. The key to be attached may be placed upon the can end across the solder which may be fused by either of the devices disclosed for attaching the key. This device has been disclosed merely to make clear that it is not necessary that only solder bearing keys be used.

While I have shown mechanical means for actuating the contacts from and against the can end, and for closing the switch, it is apparent that this might be manually done. Furthermore, it is to be understood that the present drawing is merely illustrative of one of various mechanical devices that might be employed.

Having thus described my invention, what I claim as new therein and desire to secure by Letters Patent is:—

In means for attaching solder bearing keys to can ends, a supporting base for can ends on which solder bearing keys have been located, a non conductive pressure applying member, a pair of contacts fixed on opposite sides of the said member, an electric circuit leading through the contacts, a switch in the circuit, a cam, a lever actuated thereby having operative connection for actuating the pressure member to move the contacts into a firm engagement with the can end at opposite sides of the solder bearing portion of the key, and means synchronized with the movement of the pressure member for closing the switch to close a circuit through the contacts while they are engaging the can end; said pressure member having a recess for receiving the key of a character to hold the key tightly against the can end.

GEORGE A. BARDET.
GEORGE V. BARDET.